Patented Apr. 15, 1941

2,238,486

UNITED STATES PATENT OFFICE 2,238,486

AZO COMPOUNDS AND MATERIAL COLORED THEREWITH

Joseph B. Dickey and John R. Byers, Jr., Rochester, N. Y., assignors to Eastman Kodak Company, Rochester, N. Y., a corporation of New Jersey No Drawing. Application November 13, 1939, Serial No. 304,138

12 Claims. (Cl. 260—205)

The present invention relates to azo dyestuffs and to organic derivatives of cellulose colored therewith. More particularly it relates to non-sulfonated nuclear azo compounds of the benzene and naphthalene series containing in their molecule at least one amino group in para position to an azo bond, and at least one group of the general formula:

wherein R represents an aliphatic group joined directly to or through an oxygen linkage, a nitrogen linkage, a nitrogen-sulphur linkage, or a nitrogen-carbon linkage to one of the nuclei of the molecule. More specifically R represents a member selected from the group consisting of a methylene group, an ethylene group, a propylene group, and groups represented by the structural formulae

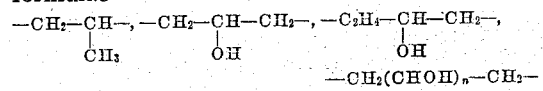

and

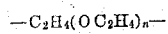

wherein $n$ is an integer. Furthermore, the nuclei of the azo compounds above described may be substituted by one or more other monovalent substituents selected from the group of atoms such as chlorine, bromine, fluorine, and radicals such as a hydroxyl group, a methyl group, an ethyl group, a butyl group, a methoxy group, an ethoxy group, an acetyl group, an acetamino group, a carbamide group, and the like.

The expressions "oxygen linkage," "nitrogen linkage," "nitrogen-sulphur linkage," and "nitrogen-carbon linkage" are intended to mean throughout the specification and claims unless otherwise specified that R in the above formula is joined to a nucleus of the azo compound through an intervening atom or group of atoms represented structurally by

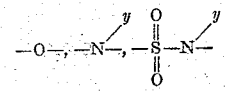

and

wherein $y$ stands for hydrogen, an alkyl group, a hydroxyalkyl group, and the group

While our invention is primarily concerned with the monoazo compounds, polyazo compounds are likewise included within the scope of the invention. For example, the diazo component may be p-aminoazobenzene or a substituted derivative of p-aminoazobenzene having no sulphonic acid group and whose diazo salt is capable of being coupled.

We have found that the azo compounds described in the preceding are excellent dyes which produce on textile materials colors of excellent fastness to light and high resistance to washing, and burnt gas fumes. It is an object of our invention, therefore, to prepare this class of azo dyestuffs and to color organic derivatives of cellulose especially cellulose acetate, therewith.

The necessary intermediates containing the carbamic acid ester grouping

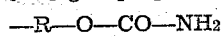

wherein R has the meaning previously defined, may be prepared by a number of methods including the process of condensing an arylamine having a hydroxyalkyl side chain group with urea or carbamyl chloride. For example, ethyl-β-hydroxyethylaniline may be condensed with carbamyl chloride, and the corresponding carbamic acid ester thereby produced may be coupled with the desired aryl diazo compound in the usual manner, or, the azo compound may first be prepared followed by condensation with urea or with carbamyl chloride.

The following examples illustrate the preparation of some of the azo compounds of our invention.

*Example 1*

1 mole of p-aminoacetophenone is diazotized with sodium nitrite and the solution added to a mixture of ice and water containing hydrochloric acid and approximately 1 mole of the carbamic acid ester of ethyl-β-hydroxyethylaniline. After standing for a relatively short time, the reaction mixture is slowly neutralized with sodium carbonate using Congo red indicator, and the dye then filtered off, washed and dried. Cellulose acetate is colored orange shades from an aqueous suspension of the dye.

The azo compound obtained has the formula:

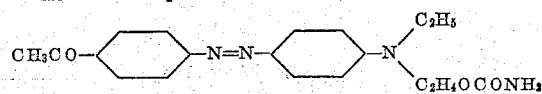

*Example 2*

1 mole of p-nitroaniline is diazotized and coupled with 1 mole of the carbamic acid ester ethyl-glyceryl aniline following the procedure of Example 1. Cellulose acetate is colored red shades from an aqueous suspension of the dye.

The azo compound obtained has the formula:

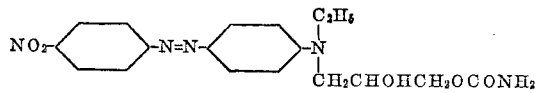

Example 3

1 mole of p-nitro-o-chloroaniline is diazotized and coupled with 1 mole of the carbamic acid ester of di-β-hydroxy-ethyl-m-toluidine following the procedure of Example 1. Cellulose acetate is colored rubine shades from an aqueous suspension of the dye.

The azo compound obtained has the formula:

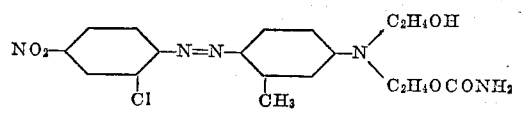

Example 4

1 mole of 4-nitro-2-methylaniline is diazotized and coupled with 1 mole of 2-β-methoxyethyl-amino-benzyl carbamate following the procedure described in Example 1. Cellulose acetate is colored orange shades from an aqueous suspension of the dye.

The azo compound obtained has the formula:

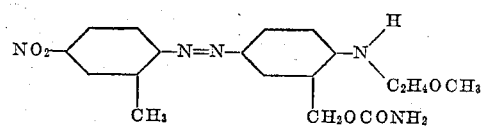

Example 5

1 mole of 2-amino-5-nitro-ethyl-β-carbamyl benzamide is diazotized and coupled with 1 mole of β-sulfoethyldiphenylamine following the procedure of Example 1. Cellulose acetate is colored red shades from an aqueous solution of the dye which may contain salt.

The azo compound has the formula:

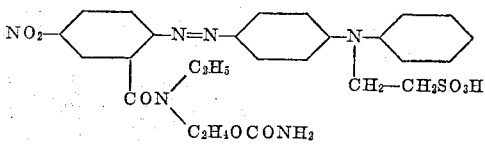

In a similar manner there may be prepared an aryl azo carbamate which has the formula:

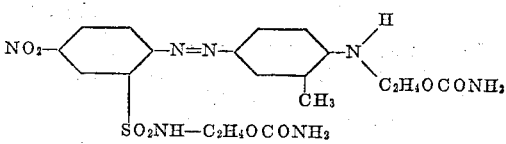

and colors cellulose acetate red shades from an aqueous suspension of the dye.

The invention is illustrated further by the following additional azo compounds which may be prepared in a manner similar to that described in Example 1. These compounds color cellulose acetate the shades of color designated.

| Diazo component | Coupling component | Shade on cellulose acetate |
|---|---|---|
| p-Nitro-o-fluoroaniline | (N-methyl-N-(CH₂CHCH₃ OCONH₂)-aniline) | Red. |
| p-Nitro-o-bromoaniline | (HO-naphthyl-NH-C₂H₄OC₂H₄OCONH₂) | Blue. |
| p-Nitro-o-chloroaniline | (N-methyl-N-ethyl-aniline with OC₂H₄OCONH₂) | Rubine. |
| p-Nitro-o-hydroxyaniline | (CH₃-naphthyl-N(CH₂CHCH₂OH)(OCONH₂)) | Pink. |
| p-Nitro-o-hydroxyethylsulfone aniline | (OC₂H₄OCONH₂, CH₃-aniline-NH-C₂H₄CH(OH)-CH₂OCONH₂) | Violet. |
| 2,4-dinitroaniline | (OCH₃, NHCONH₂-aniline-N(C₂H₄OCONH₂)₂) | Blue. |
| 2,4-dinitro-6-hydroxyaniline | (naphthyl-NH-CH₂CHOHCH₂OCONH₂) | Do. |

| Diazo component | Coupling component | Shade on cellulose acetate |
| --- | --- | --- |
| 2,4-dinitro-6-fluoroaniline | [phenyl with OCH$_3$, CH$_3$, N(C$_2$H$_5$)(C$_2$H$_4$OC$_2$H$_4$OCONH$_2$)] | Purple. |
| 2,4-dinitro-6-chloroaniline | [phenyl with OCH$_3$, NHCOCH$_3$, N(C$_2$H$_5$)(CH$_2$CHOHCH$_2$OCONH$_2$)] | Blue. |
| Do | [phenyl with CH$_3$, CH$_3$, NH(C$_3$H$_6$OCONH$_2$)] | Violet. |
| Do | [phenyl with CH$_3$, morpholine-type N(C$_2$H$_4$OCONH$_2$)(CH$_2$CH$_2$O-)] | Blue. |
| p-Aminoazobenzene | [phenyl with CH$_3$, N(CH$_2$(CHOH)$_3$CHCH$_2$OCONH$_2$)(CH$_2$-CH-CH$_2$-O ring with OCONH$_2$)] | Rubine. |

In the application of the azo compounds of the invention to the coloration of organic derivatives of cellulose, the dyes are ordinarily applied to the materials from their aqueous solutions or suspensions. If the particular dye is insoluble or only slightly soluble in water, it is first ground to a paste with a dispersing agent such as a soap, a sulfonated oil, or a higher fatty acid glyceryl sulfate, and the resulting paste then dispersed in water. The dispersion is then heated to a temperature of about 45–55° C., the material immersed therein, and the temperature gradually increased to about 80–85° C., at which point the material is worked for several hours. Salt may be added to facilitate exhaustion of the dye bath during the dyeing operation. When the material has attained the desired shade or condition of color, it is removed from the bath, washed with soap, rinsed and dried. If on the other hand the particular dye is water-soluble, the dyeing operation may be performed in an aqueous solution of the dye containing salt without the necessity of employing any kind of dispersing or solubilizing agent.

The dye compounds of the invention which have a free amino group as a nuclear substituent thereof may be applied to the material to be colored in the manner above described, followed thereafter by diazotization and coupling in situ with couplers such as β-hydroxy-3-naphthoic acid to yield deep black shades of color. The following example illustrates the process, it being understood that the invention is not restricted to the specific azo compound or coupling component disclosed. For example, any of the azo compounds of the invention previously described which contain a nuclear nitro group substituent may be reduced to the corresponding amine, applied to the fiber, diazotized and developed in situ.

*Example 6*

2 parts of

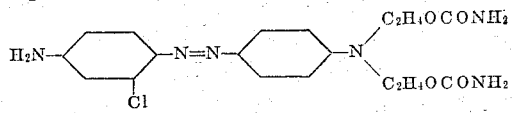

are ground with 9 parts of a dispersing agent such as soap or oleyl glyceryl sulfate and the resulting paste dispersed in 3000 parts of water. The dispersion thus prepared is heated to a temperature approximating 40–50° C., and 100 parts of cellulose acetate fabric is immersed therein. The temperature is then gradually raised to 70–80° C., and the fabric worked at this temperature until the desired shade or condition of yellow color is acquired. It is then removed from the bath, rinsed with water, and diazotized during 20 to 30 minutes in a fresh cold bath consisting of 6 parts of sodium nitrite, 15 parts of hydrochloric acid of 20° Bé., and 3000 parts of water. After the diazotization is complete, the fabric is well rinsed with water and developed to a deep black color over a period of about 30 minutes, starting with a luke-warm bath and gradually increasing to a finishing temperature of about 60° C., in a bath consisting of 6 parts of β-hydroxy-3-naphthoic acid, 12 parts of sodium acetate, and 3000 parts of water.

While our invention has been illustrated in connection with the dyeing of cellulose acetate silk, it will be understood that the same processes are not limited exclusively to cellulose acetate, but are likewise applicable for coloring organic derivatives of cellulose in general, including the hydrolyzed as well as the unhydrolyzed organic acid esters such as cellulose formate, cellulose propionate, cellulose butyrate, cellulose acetate-butyrate, cellulose acetate-propionate and cellulose ethers such as methyl cellulose, ethyl cellulose, and benzyl cellulose.

We claim:

1. The non-sulfonated nuclear azo compounds having the general formula:

$$R_1—N=N—R_2$$

wherein $R_1$ represents an aryl nucleus of the benzene series, $R_2$ represents a member selected from the group consisting of an aryl nucleus of the benzene series, and an aryl nucleus of the naphthalene series, the said compounds containing in their molecule at least one amino group in position para to the azo group, and at least one group of the general formula:

$$—R—O—CO—NH_2$$

wherein R represents an aliphatic group joined to the molecule through a member selected from the group consisting of

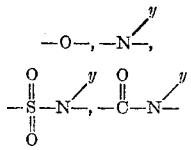

and a carbon atom of R, and wherein $y$ represents a member selected from the group consisting of hydrogen, an alkyl group, a hydroxyalkyl group, and the group $—R—O—CO—NH_2$.

2. The non-sulfonated nuclear azo compounds having the general formula:

$$R_1—N=N—R_2$$

wherein $R_1$ and $R_2$ each represents an aryl nucleus of the benzene series, the said compounds containing in their molecule at least one amino group in position para to the azo group, and at least one group of the general formula:

$$—R—O—CO—NH_2$$

wherein R represents an aliphatic group joined to the molecule through a member selected from the group consisting of

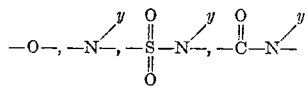

and a carbon atom of R, and wherein $y$ represents a member selected from the group consisting of hydrogen, an alkyl group, a hydroxyalkyl group, and the group $—R—O—CO—NH_2$.

3. The non-sulfonated nuclear azo compounds having the general formula:

$$R_1—N=N—R_2$$

wherein $R_1$ represents an aryl nucleus of the benzene series, $R_2$ represents a member selected from the group consisting of an aryl nucleus of the benzene series, and an aryl nucleus of the naphthalene series, the said compounds containing in their molecule at least one amino group in position para to the azo group, and at least one group of the formula:

$$—R—O—CO—NH_2$$

wherein R represents an aliphatic group joined to the molecule through an oxygen atom.

4. The non-sulfonated nuclear azo compounds having the general formula:

$$R_1—N=N—R_2$$

wherein $R_1$ and $R_2$ each represents an aryl nucleus of the benzene series, the said compounds containing in their molecule at least one amino group in position para to the azo group, and at least one group of the formula:

$$—R—O—CO—NH_2$$

wherein R represents an aliphatic group joined to the molecule through the group

wherein $y$ represents a member selected from the group consisting of hydrogen, an alkyl group, a hydroxyalkyl group, and the group $—R—O—CO—NH_2$.

5. The non-sulfonated nuclear azo compounds having the general formula:

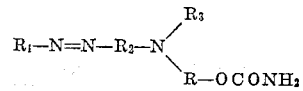

wherein R represents an aliphatic group, $R_1$ and $R_2$ each represents a benzene nucleus, and $R_3$ represents a member selected from the group consisting of hydrogen, an alkyl group, a hydroxyalkyl group, and the group $—R—O—CO—NH_2$.

6. The non-sulfonated nuclear azo compounds having the general formula:

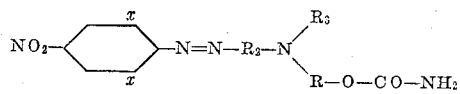

wherein each $x$ represents a member selected from the group consisting of hydrogen, a halogen, a hydroxyl group, an alkyl group, and a nitro group, R represents an aliphatic group, $R_2$ represents a benzene nucleus, and $R_3$ represents a member selected from the group consisting of hydrogen, an alkyl group, a hydroxyalkyl group, and the group $—R—O—CO—NH_2$.

7. Material made of or containing an organic derivative of cellulose colored with a dye selected from the group of non-sulfonated nuclear azo compounds having the general formula:

$$R_1—N=N—R_2$$

wherein $R_1$ represents an aryl nucleus of the benzene series, $R_2$ represents a member selected from the group consisting of an aryl nucleus of the benzene series, and an aryl nucleus of the naphthalene series, the said compounds containing in their molecule at least one amino group in position para to the azo group, and at least one group of the general formula:

$$—R—O—CO—NH_2$$

wherein R represents an aliphatic group joined to the molecule through a member selected from the group consisting of

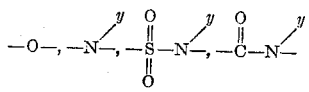

and a carbon atom of R, and wherein $y$ represents a member selected from the group consisting of hydrogen, an alkyl group, a hydroxyalkyl group, and the group $—R—O—CO—NH_2$.

8. Material made of or containing cellulose acetate colored with a dye selected from the group of non-sulfonated nuclear azo compounds having the general formula:

$$R_1—N=N—R_2$$

wherein $R_1$ represents an aryl nucleus of the benzene series, $R_2$ represents a member selected from the group consisting of an aryl nucleus of the benzene series, and an aryl nucleus of the naphthalene series, the said compounds containing in their molecule at least one amino group in position para to the azo group, and at least one group of the general formula:

—R—O—CO—NH₂ wherein R represents an aliphatic group joined to the molecule through a member selected from the group consisting of

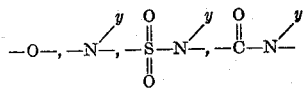

and a carbon atom of R, and wherein y represents a member selected from the group consisting of hydrogen, an alkyl group, a hydroxyalkyl group, and the group —R—O—CO—NH₂.

9. Material made of or containing an organic derivative of cellulose colored with a dye selected from the class of non-sulfonated nuclear azo compounds having the general formula:

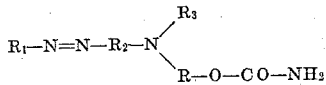

wherein R represents an aliphatic group, R₁ and R₂ each represents a benzene nucleus, and R₃ represents a member selected from the group consisting of hydrogen, an alkyl group, a hydroxyalkyl group, and the group —R—O—CO—NH₂.

10. Material made of or containing cellulose acetate colored with a dye selected from the class of non-sulfonated nuclear azo compounds having the general formula:

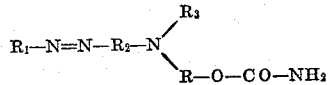

wherein R represents an aliphatic group, R₁ and R₂ each represents a benzene nucleus, and R₃ represents a member selected from the group consisting of hydrogen, an alkyl group, a hydroxyalkyl group, and the group —R—O—CO—NH₂.

11. Material made of or containing an organic derivative of cellulose colored with a dye selected from the class of non-sulfonated nuclear azo compounds having the general formula:

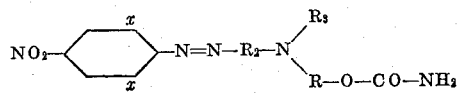

wherein each x represents a member selected from the group consisting of hydrogen, a halogen, a hydroxyl group, an alkyl group, and a nitro group, R represents an aliphatic group, R₂ represents a benzene nucleus, and R₃ represents a member selected from the group consisting of hydrogen, an alkyl group, a hydroxyalkyl group, and the group —R—O—CO—NH₂.

12. Material made of or containing cellulose acetate colored with a dye selected from the class of non-sulfonated nuclear azo compounds having the general formula:

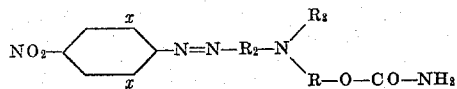

wherein x represents a member selected from the group consisting of hydrogen, a halogen, a hydroxyl group, an alkyl group, and a nitro group, R represents an aliphatic group, R₂ represents a benzene nucleus, and R₃ represents a member selected from the group consisting of hydrogen, an alkyl group, a hydroxyalkyl group, and the group —R—O—CO—NH₂.

JOSEPH B. DICKEY.
JOHN R. BYERS, Jr.